BOLT CUTTER
Original Filed Aug. 15, 1957
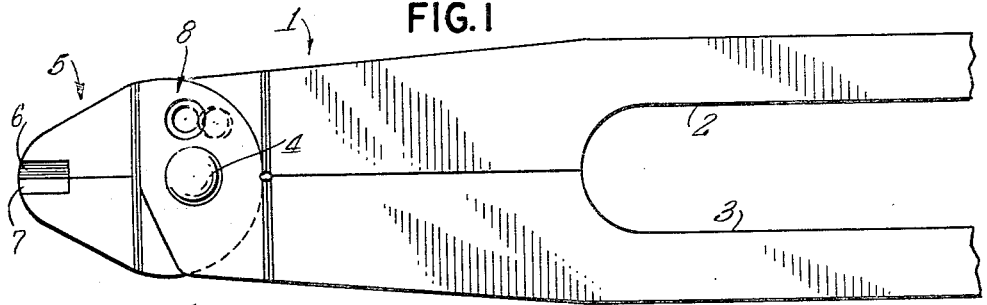
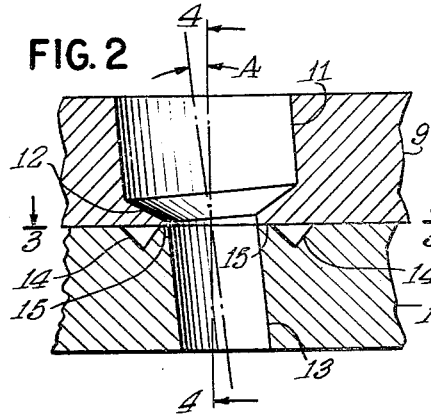
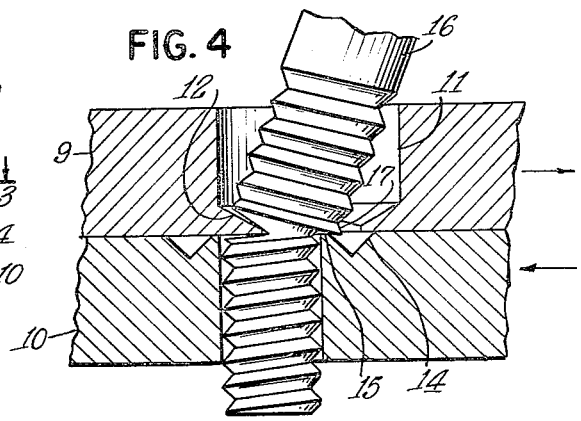
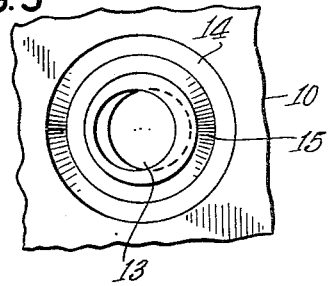
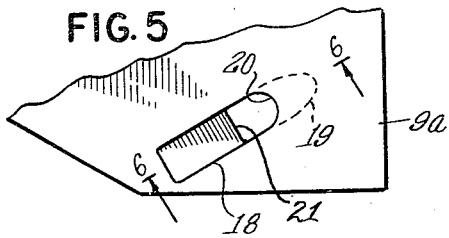
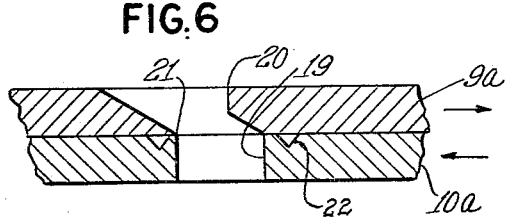
INVENTOR.
LLOYD A. BUCHALTER
BY Ernest Famwick
ATTORNEY

United States Patent Office 2,957,242
Patented Oct. 25, 1960

2,957,242
BOLT CUTTER

Lloyd A. Buchalter, Ridgefield, Conn., assignor to Burndy Corporation, a corporation of New York Continuation of application Ser. No. 678,400, Aug. 15, 1957. This application Dec. 9, 1959, Ser. No. 858,552

8 Claims. (Cl. 30—254)

This invention relates to screw or bolt cutters, and more particularly to a device for cutting a threaded shaft without materially damaging the threads.

This application is a continuation of U.S. application Serial Number 678,400, filed August 15, 1957, now abandoned.

In the past, persons working with screws or bolts have faced the problem of cutting these items to a desired length. Normally, when these screws and bolts were cut, the threads were damaged to such an extent that the screw became unuseable in cooperation with a nut or tapped hole made in accordance with normal commercial tolerances. As an expedient, artisans working in the field utilized a cooperating nut as a die. When faced with the necessity of cutting a length of threaded rod from a bolt, they first screwed the nut on the bolt past the length to be cut off. After shearing the unwanted portion from the remainder of the bolt, the nut was removed, thus chasing, or reforming, the threads. In effect, the nut merely acted as a die.

More recently, the nut or die portion of the above method was incorporated as part of a hand tool. The die portion was set in one-half of the head of a pliers and the screw threaded therein and caused to protrude the desired length to be cut off. The handles of the pliers were closed, causing the other half of the plier head to shear off the protruding portion of the screw. This method was identical to the method long used in the field, i.e. reforming the threads by the use of a die, and the disadvantages were similar. These disadvantages included the three-step operation of first screwing the bolt into the die, then shearing the unwanted portion, and finally chasing or reforming the threads. This last step of course, weakened the thread structure. In addition, since a die member was used in this method, each bolt cutter had to be designed for a single bolt size even though they might have shared operating levers in common.

One of the objects of the bolt cutter of this invention is to provide a device capable of cutting a threaded shaft without material damage to the screw.

Another object of this invention is to provide a bolt cutter capable of shearing an unwanted length from the threaded body of a bolt and leaving a bolt portion capable of cooperating with a nut without the necessity of reforming the threads.

One of the features of this invention is the provision of a bolt cutter having a pair of members disposed in cooperative relation, movable with respect to each other; in which the upper or shearing member includes means for positioning a threaded rod in such a manner that the shearing angle is substantially equal to the angle of the plane of the helix formed by the threads.

Another feature of this invention includes the provision in the lower or base member of a recess to receive and prevent damage to the threads of the cut rod during the shearing operation.

Yet another feature of this invention includes the provision of a cutting edge for the shearing member of an inclined plane or wedge shape cross-section, the angle of said plane or wedge being substantially equal or less than one half the basic angle of the thread on the rod.

These and other features and objects of this invention will become more apparent by reference to the following description taken in conjunction with the accompanying drawing, in which:

Fig. 1 is a plan view of a hand tool incorporating the bolt cutter of this invention;

Fig. 2 is a cross-sectional view in elevation of the bolt cutter of this invention;

Fig. 3 is a plan view of the lower member of the bolt cutter of this invention taken along the lines 3—3 of Fig. 2;

Fig. 4 is a cross-sectional view taken along the lines 4—4 of Fig. 2 of the bolt cutter of this invention during the cutting of a threaded rod;

Fig. 5 is a plan view of the upper member of an alternate embodiment of a bolt cutter according to the principles of this invention; and Fig. 6 is a cross-sectional view in elevation of this bolt cutter taken along the lines 6—6 of Fig. 5.

Referring to Fig. 1 of the drawing, a hand tool incorporating a bolt cutter in accordance with the prinicples of this invention is therein shown, illustrated as a wire and bolt cutter pliers 1. The pliers 1 comprises a pair of handles 2 and 3, functioning as levers, and a head portion 5. Each handle 2, 3, is integrally connected to half of the cooperating head members. The head members terminate in cutting edges 6 and 7 which may be utilized to cut wire. A pivot 4 constrains each half of the pliers 1 to arcuate motion. The bolt cutter of this invention is shown generally at 8 to comprise substantially a hole in the upper jaw face and a hole, shown dotted, in the lower jaw face.

Referring to Fig. 2 of the drawing, the bolt cutter in accordance with the principles of this invention is therein shown, in greater detail, in a cross-sectional view in elevation. Essentially, this invention comprises an upper body or shearing member 9 and a base or lower back-up member 10.

The upper plate, or shearing member 9, has a countersunk hole 11 drilled in at an angle "A" to the surface of the plate 9. The countersinking of the hole 11 is made in such a manner as to provide a cutting edge 12. The angle of the cuting edge 12 at the bottom of the hole 11 should approximate the angle of the flank of the thread to be cut and should come to a sharp edge sufficient for the shearing operation. The basic angle, or angle between adjacent faces of adjacent threads is 60° in standard U.S. threads. The standard U.S. drill point is ground to an included angle of 59°. If the cutting edge 12 is made in a hole 11 which is not inclined, i.e. has an angle "A" equal to zero, by means of a standard drill point, a cutting edge of 31° will be formed. This is substantially equal to one half the basic angle, and has proven satisfactory in embodiments of this invention which do not use, as hereinafter noted, the inclined positioning of the rod feature.

The angle of inclination "A" at which the hole 11 is drilled and countersunk is determined by the helix angle of the thread sizes intended to be sheared and is such that it causes the cutting edge 12 to closely fit the helix angle of the thread to be cut as the threaded rod or bolt is held perpendicular to the surface of the shearing member 9. The plane of the angle of tilt of the hole 11 is perpendicular to the direction of motion between the plates 9 and 10. The diameters of the holes 11 and 13 are dependent upon the size of the largest screw intended to be cut.

It is, of course, obvious to anyone skilled in the art that the bolt may be held by means other than a hole in the plate to allow two members to shear off a portion of the threaded shank.

Referring to Figs. 2 and 3 of the drawing, the base member or back-up plate 10 is therein shown to include a hole 13 in line with the hole 11 in the shearing member 9. The hole 13 may, for convenience, be drilled at the same angle as the hole in the shearing member 9, although this is not critical so long as the hole 13 is aligned with the hole 11 to receive the excess, undesired portion of the threaded rod to be cut. Associated with the hole 13 is a cavity or recess 14. The recess 14, which may be annular, is of suitable cross-section and size, so that only a small ridge 15 remains between the edge of the hole 13 and the recess 14. The recess 14 provides a space into which the thread of the screw moves while the shearing operation is performed, thus preventing the squashing or burring of the threads against the surface of the base member 10.

Referring to Fig. 4 of the drawing, the operation of a bolt cutter in accordance with the principles of this invention is therein illustrated. The upper plate or shearing member 9 of Fig. 4 is illustrated as moving to the right in relation to the base plate 10. In Fig. 2 the upper plate 9 is illustrated as moving away from the viewer relative to the movement of the lower plate 10. Thus, Figs. 2 and 4 are illustrations of the bolt cutter at right angles to each other. As the screw 16 is cut, the upper, severed portion of the shank rides up the slope of the cutting edge 12 causing the bolt to tilt in the direction of motion of the shearing member 9. As the screw 16 tilts, it pivots about the unsevered portion of the shank and the side of the screw 16 away from the cutting edge 12 is tilted down towards the surface of the base member 10. When no clearance is provided for this motion the lowest thread of the severed portion contacts the surface of the base member 10 and is deformed, thus preventing the use of the screw in cooperation with tapped hole or nuts made to standard commercial tolerances, without the reformation of the threads. This invention provides a clearance space in the form of a cavity or recess 14 in the direction of the motion, and eliminates the cause of squashing or burring of the threads on the severed portion of the bolt, allowing the successful use of this device. The recess 14 need only provide sufficient clearance for receiving the threads of this severed portion of the bolt during the cutting operation.

It should also be understood that the bolt cutter of this invention may be used for a plurality of different sized bolts or screws or threaded rods so long as the pitch of the thread is such that they are positioned substantially parallel to the shearing plane, or in other words, that the number of threads per inch does not vary too greatly from the standard for which the cutter was designed. Under these conditions, this invention will cut a bolt in a manner which will allow it to be used in cooperation with tapped hole or threaded nut made to the usual commercial tolerances. Referring to Figs. 5 and 6 of the drawing, an alternate embodiment of the bolt cutter in accordance with the principles of this invention is therein shown to comprise an upper shearing plate 9a and a lower base plate 10a. The upper plate 9a contains an inclined ramp 18 forming a cutting edge 21. The lower base member 10a contains a bolt receiving hole 19 and a cavity or recess 22. The inclined ramp terminates in a shearing or cutting edge 21. The bolt to be cut is located in the aligned hole in the upper and lower plates 9a and 10a and the operation of this phase of my invention is similar to the operation described in connection with Figs. 1–4.

It should be noted that the incorporation in a bolt cutter of the three features of this invention, i.e. (1) the positioning of the rod so that the shearing angle is substantially equal to the angle of the plane of the helix formed by the threads; (2) the recess to receive and prevent damage to the threads during shearing; and (3) the utilization of a shearing edge of inclined plane cross-section wherein the angle of the plane is substantially equal to or less than one half the basic angle of the thread; provides a shearing operation which results in undamaged threads substantially 100% of the time. Use of only the recess and inclined plane edge features, results in some dropping off of the efficiency of the tool, or in other words the ratio of the number of shearing operations resulting in undamaged threads to the total number of shearing operations. Use of only the inclined plane edge feature results in a further dropping off of the undamaged thread ratio, but the ratio still results in an efficiency which is quite acceptable and vastly superior to the ratio obtained by the prior art.

While I have described above the principles of my invention in connection with the specific apparatus, it is to be clearly understood that this description is made only by way of example and not as a limitation of the scope of my invention as set forth in the objects thereof and the accompanying claims.

I claim:

1. A tool for cutting threaded rod comprising a first member having a shearing plate including an opening therethrough disposed at a nonperpendicular angle to the surface of said plate, a second member having a base plate including an opening therethrough at least in part aligned with the opening of said first member to receive a portion of said threaded rod to be cut, said first and second members adapted and arranged for shearing motion therebetween, means to locate a threaded rod for shearing by said first and second members to cause the shearing angle to be substantially equal to the angle of the plane of the helix of said threads and a recess in one of said members to receive the threads of the severed portion of said threaded rod during the shearing operation.

2. A tool for cutting a threaded rod comprising a first member including a shearing plate having an opening therethrough adapted to receive a threaded rod, said opening being countersunk to form a cutting edge; a second member including a base plate having an opening therethrough at least in part aligned with the opening in said first member to receive the portion of said threaded rod to be severed, said first and second members adapted and arranged for shearing motion therebetween, means to locate a threaded rod for shearing by said first and second members to cause the shearing angle to be substantially equal to the angle of the plane of the helix of said threads and a recess in one of said members to receive the threads of the severed portion of said threaded rod during the shearing operation.

3. The tool in accordance with claim 2 wherein one side of said opening in said upper plate includes an inclined plane to form said cutting edge.

4. A tool for cutting a threaded rod comprising a first member including a shearing plate having an opening therethrough, a second member including a base plate having an opening therethrough at least in part aligned with the opening in said first member to receive the portion of said threaded rod to be severed, said first and second members adapted and arranged for shearing motion therebetween, means to locate a threaded rod for shearing by said first and second members to cause the shearing angle to be substantially equal to the angle of the plane of the helix of said threads and a recess in said base plate to receive the threads of the severed portion of said threaded rod during the shearing operation.

5. A tool for cutting threaded rod comprising a first member including a shearing plate having an opening therethrough adapted to receive a threaded rod, said opening disposed at a nonperpendicular angle to the surface of said first member, a second member including a base plate having an opening therethrough at least in part aligned with the opening in said first member to receive the portion of said threaded rod to be severed, and means to constrain said first and second members to pivot about a common point.

6. A tool for cutting a threaded rod comprising a first member including a shearing plate having an opening therethrough adapted to receive a threaded rod, a second member including a base plate having an opening therethrough at least in part aligned with the opening in said first member to receive the portion of said threaded rod to be severed and an annular recess disposed about the opening in said base plate.

7. A tool for cutting a threaded rod comprising: a first member including a shearing plate having an opening therethrough adapted to receive a threaded rod, at least a portion of said opening being of inclined plane cross-section to form a cutting edge, the angle of said plane being substantially equal to or less than one half the basic angle of the thread on said rod, and a second member including a base plate having an opening therethrough at least in part aligned with the opening in said first member to receive the portion of said threaded rod to be severed, means to move one of said members relative to said other member, whereby a threaded rod inserted through the openings in said first and second members is sheared when one of said members is moved relative to said other member.

8. A tool according to claim 7 further including a recess in one of said members to receive the threads of the severed portion of said threaded rod during the shearing operation.

References Cited in the file of this patent
UNITED STATES PATENTS

| | | |
|---|---|---|
| 13,570 | Grover | Sept. 18, 1855 |
| 529,488 | Gile | Nov. 20, 1894 |
| 776,879 | Wolfe | Dec. 6, 1904 |
| 955,287 | Schofield | Apr. 19, 1910 |
| 2,102,744 | Ratcliffe | Dec. 21, 1937 |
| 2,288,385 | Beard | June 30, 1942 |
| 2,527,735 | Johnson | Oct. 31, 1950 |
| 2,560,318 | Wenger | July 10, 1951 |